Sept. 29, 1953 G. SLAYTER 2,653,887
METHOD OF PRODUCING TUBING
Filed Aug. 1, 1947 2 Sheets-Sheet 1
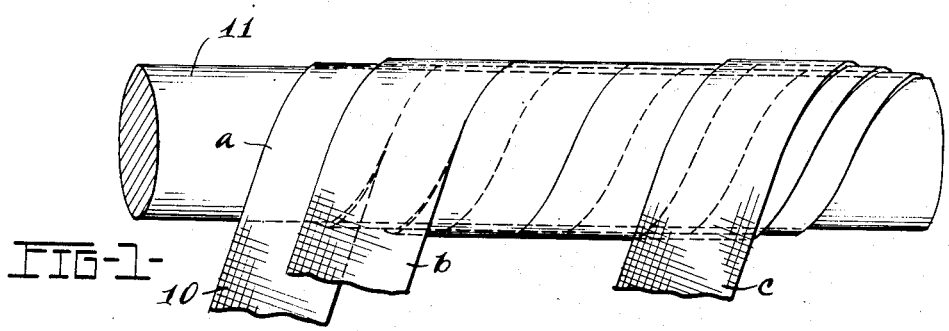
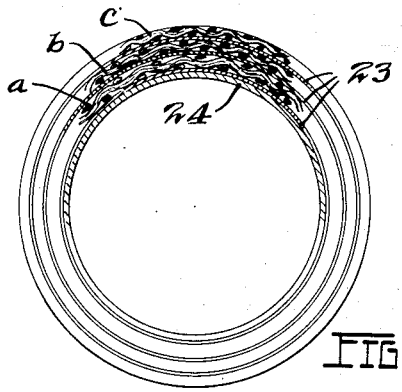
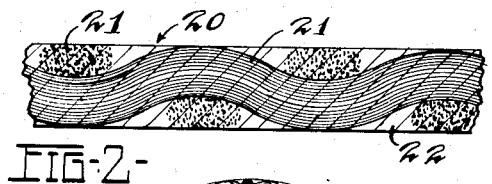
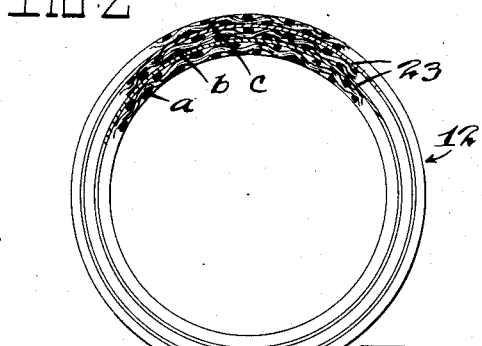
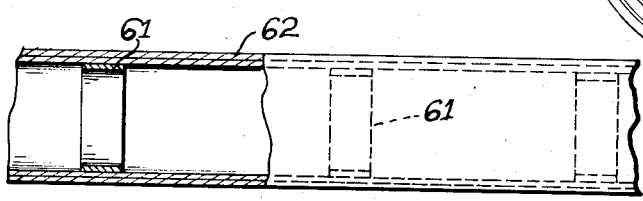
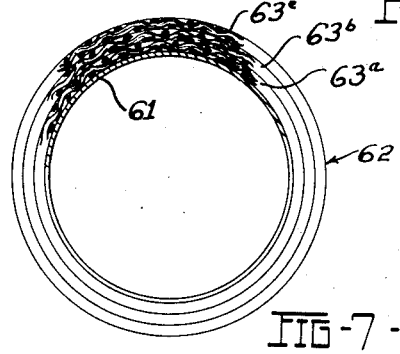
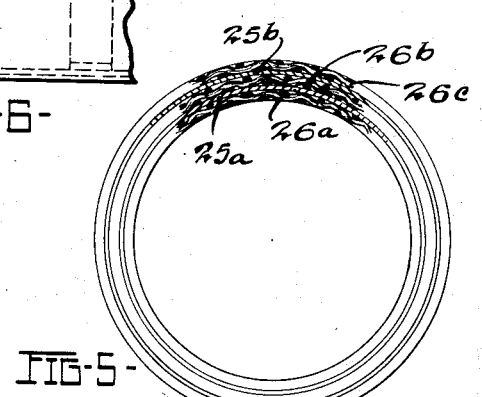
INVENTOR.
GAMES SLAYTER
BY
*Staehli & Overman*
ATTYS.

Sept. 29, 1953   G. SLAYTER   2,653,887
METHOD OF PRODUCING TUBING
Filed Aug. 1, 1947   2 Sheets-Sheet 2
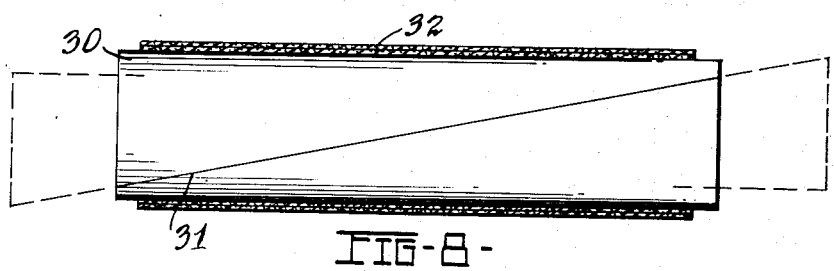
FIG-8-
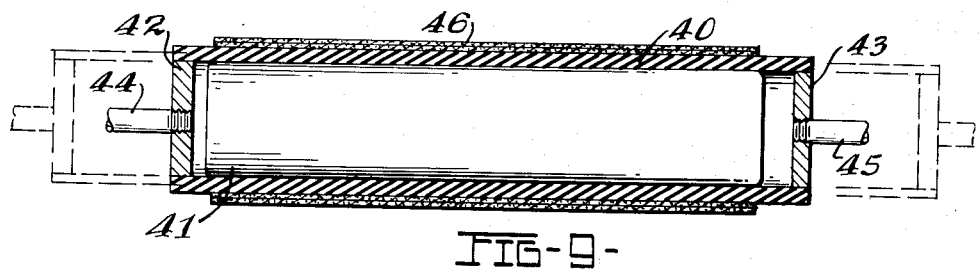
FIG-9-
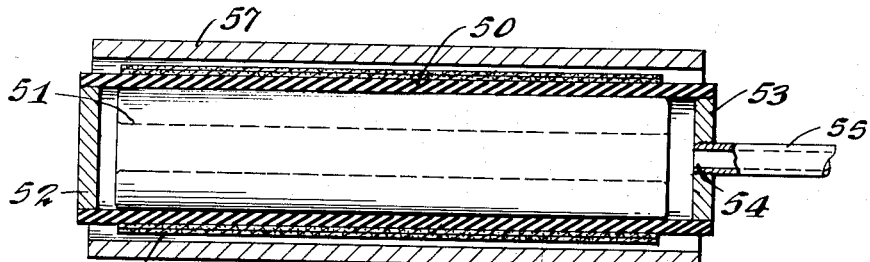
FIG-10-
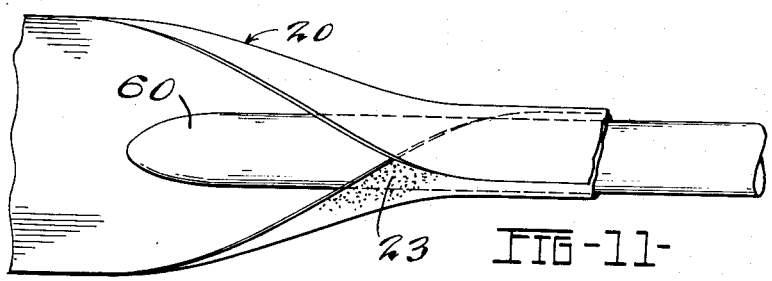
FIG-11-
INVENTOR.
GAMES SLAYTER
BY
Staehli & Overman
ATTYS Patented Sept. 29, 1953

2,653,887

UNITED STATES PATENT OFFICE 2,653,887

METHOD OF PRODUCING TUBING

Games Slayter, Newark, Ohio, assignor to Owens-Corning Fiberglas Corporation, a corporation of Delaware Application August 1, 1947, Serial No. 765,622

3 Claims. (Cl. 154—83)

This invention relates to plastic tubing and the method and apparatus for manufacturing the same. More particularly, it relates to the fabrication of plastic tubing or pipe having walls reinforced with fibrous materials, such, for example, as layers constituted essentially of glass fibers.

It is an object of this invention to produce a new and improved method for manufacturing structurally strong plastic pipe or tubing, the walls of which are reinforced by layers of fibrous materials having substantially no tendency to delaminate and which may be constructed to range from a porous wall for irrigation purposes to a completely impervious wall for use in the transportation of fluids.

Another object is to produce a method for continuously manufacturing endless lengths of seamless tubing of resinous material reinforced with glass fibers.

A still further object is to produce a structurally strong plastic pipe by constructing the side walls thereof of resinous impregnated glass fiber fabrics which before or after assembly are treated in a manner to provide for a high degree of translucency through the walls, as well as various degrees of flexibility through the walls.

A still further object is to provide a method for economically and rapidly producing low cost plastic tubing or pipe employing glass fibers or other reinforcing means for strengthening purposes in predetermined directions, the plastic pipe being constructed to have the additional characteristics of transparency, varying degrees of flexibility, imperviousness and self-sealing properties for uses ranging from irrigation hose, fluid carrying pipe, ladder rungs, or shaped tubular structural members.

These and other objects and advantages of this invention will become apparent from the description and claims, and for purposes of illustration but not of limitation, embodiments of the invention are shown in the accompanying drawings, in which:

Figure 1 illustrates one method for manufacturing tubing in accordance with this invention;

Figure 2 is an enlarged detail view of a template sheet of a glass fiber fabric embedded in a continuous body of resinous material;

Figure 3 is a detail cross section through one form of tubing embodying the features of this invention;

Figure 4 is a detail cross sectional view through another form of tubing embodying other features of this invention;

Figure 5 is a detail cross sectional view of still another form of tubing;

Figure 6 is a longitudinal elevational view partially in section illustrating the use of rigid inserts to impart structural strength to the pipe;

Figure 7 is a sectional view taken along the line 7—7 of Figure 6;

Figure 8 is an elevational view illustrating a mandrel suitable for the manufacture of plastic tubing, shown in section thereon;

Figure 9 is a sectional elevational view of another form of mandrel embodying features of this invention;

Figure 10 is a sectional elevational view of still another form of mandrel for molding plastic pipe; and Figure 11 illustrates still another method for forming endless lengths of seamless tubing.

The various features of this invention can be described in connection with the manufacture of tubing formed by the often used process of helically winding strips 10 of resinous treated fabrics in side-by-side or overlapping relation on a mandrel 11 and then subjecting the whole to resinous curing conditions to form a composite tubing 12 that may be stripped from the mandrel. As illustrated in Figures 1 and 3, three layers, a, b and c, of resinous treated fabric make up the side wall construction of the tubing, but the number of layers or plies may equally be varied from one layer up to twenty layers or more, depending on the strength, wall thickness and properties desired of the tubing. Alternatively, the fibrous fabric may be wound as desired on the mandrel, and between each layer, sufficient resinous material is added by various known means, such as by brushing, spraying, flow coating or by forming alternate layers of a resinous material in sheet form and the like, to effect the desired bonding relation and imperviousness.

Since glass fibers inherently possess many characteristics desirable in a tubing of the type described, the invention will be described in connection therewith, it being understood that other organic or inorganic and mineral fibers may equally be used. These glass fibers may be used in various forms. For example, yarns of intertwisted or untwisted glass fibers may be helically wound on the drum with the yarns in each layer extending generally in the same direction or with alternate layers of yarns extending generally in the same direction but crossing intermediate yarn layers. Glass fibers may also be used in the form of mats in which they are haphazardly arranged and interfelted, and, in some instances, interbonded with a small amount of binder, in a manner to provide sufficient mass integrity to resist the forces incident to normal handling. Even more suitable is a loosely or tightly woven textile fabric made up of yarns of "continuous" or "staple" fibers as the warp and fill threads, or only one or the other in combination with other fibers, such as cotton fibers, depending on the distribution of strength desired in the finished product. The strength distribution may also selectively be varied by winding the cloth on a bias about the mandrel.

Resinous materials suitable for use in combination with the fibrous fabrics that constitute parts of the tubing wall may be selected from a wide variety of materials including the thermosetting and thermoplastic resinous materials, natural and synthetic rubbers, the organo-silicon compounds, and the constituents of cold and semihot molding compounds such as cement, clay, oils, waxes and pitches.

Included in the group of suitable thermosetting resins are reaction products of the phenols and their derivatives of cresols, resorcinols and the like with an aldehyde; nitrogenous resin forming compounds, such as urea and melamine with an aldehyde such as formaldehyde, and other condensation reaction products of furfuryl alcohol, furfural, anilin and the like. Of even greater importance in the manufacture of tubing with glass fibers, are the thermosetting resinous compositions generally referred to as "contact resins," "low pressure molding resins," or "solventless varnishes," for these materials may be applied while in a fluid stage and reacted to the "C" stage at elevated temperatures or solely under the influence of catalyst, with or without employing pressures. Since no solvents are present, a substantially void-free product results which appears readily to wet the glass fiber surfaces and strongly to adhere thereto. Solventless varnishes of the type described are the polymerization and copolymerization reaction products of allyl alcohol and derivatives thereof, the copolymerization reaction products of these allyl type compounds with saturated or unsaturated dibasic acids with or without modification with polyhydric alcohols, styrene and derivatives thereof, acrylic esters and derivatives thereof, and the like unsaturated monomeric or polymeric substances; unsaturated polyesters which include the reaction products of unsaturated polybasic acids, such as maleic acid or fumaric acid and the like and unsaturated polyhydric alcohols with each other or one or the other respectively with saturated polybasic acids, such as phthalic acid, and polyhydric alcohols such as glycol, glycerol, pentaerythritol and the like. These may be modified with monomeric styrene, acrylic acids and esters and the like. Suitable allylic type resinous materials are described in the United States patent to Muskat et al., No. 2,332,460, dated October 19, 1943.

Among the group of thermoplastic resins, the vinyl polymers and copolymers such as polyvinyl chloride, vinyl chloride-acetate copolymers, polyvinyl acetals, polyvinylidene chloride, vinylidene chloride-vinyl chloride copolymer appear most suitable, although other thermoplastic resins, such as the polyacrylates, polystyrenes, polychlorostyrenes, cellulose esters and ethers, and hydrocarbon polymers and co-polymers may equally be used.

In the past, plastic tubing has been manufactured by winding the resinous impregnated fabric about a mandrel, or by applying the resinous material in liquid form to the fabric as each layer is wound about the mandrel, and then curing the resinous constitutents under the influence of heat. The curing operation may have been effected with or without the application of pressures. During the cure, the resinous material generally contracts to a variable extent, depending on its composition, and since the cure takes place from the inside or outside of the wall, depending on the manner in which the heat is applied, such strains are set up throughout as may cause the product to delaminate in some stage of its manufacture or use. This factor is especially significant when the reinforcing fabric comprises glass fibers, and the resinous material is one of the contact or low pressure resins described, for these resinous materials are known to contract as much as ten to twenty-five percent during the cure. Since the glass fibers provide very little basis for mechanical anchorage, the fabric layers are readily separated one from another and the resinous material, with the result that an inferior product is produced.

I have discovered that the amount of shrinkage and correspondingly the degree of strain developed in the tubing during manufacture can be greatly reduced and the tendency to delaminate substantially eliminated if, instead, the layers are formed of a template sheet 20 of a fabric of fibers, such as glass fibers 21, fully impregnated with resinous material 22 in cured condition. The template sheet 20 may then be helically wound on the mandrel 11 with only so much resinous material or adhesive 23 provided between layers as will be necessary to effect adherence between adjacent faces. Thus, only a small portion of the material is subject to a dimensional change during the cure, and the desired structure, having relatively little strain or stress, is produced in a very expeditious manner.

I have found that the bond between layers, providing what appears to be a continuous phase, may be formed if the applied resinous binder 23 is of the same or closely related composition as that which comprises the impregnant in the template sheet, although the desired results may also be accomplished by employing other resinous adhesives. Whether the same, closely related, or other suitable resinous adhesive is used, the interfacial bond between layers can be further increased if the surfaces of the template sheet to be engaged are first roughened. This enables more effective development of a physical anchorage and chemical bond.

Various effects and physical characteristics may be provided in the tubing merely by the proper selection of resinous materials as the impregnant or binder or by the subsequent treatment of template sheet before or after being fabricated into tubing form. For example, a relatively transparent tubing may be obtained if a clear resinous material and binder is selected, having an index of refraction similar to that of the glass fiber composition and which readily wets the glass. Even though a resinous material is selected which does not have an index of refraction resembling that of the glass composition, a translucent tubing may still be obtained. In specific illustration, a template sheet 20 may be produced of an all glass fiber fabric fully impregnated with a solventless varnish 22 of the type designated by the trade name Selectron 5003, which comprises a copolymer of an unsaturated polyester with styrene. If the cured composite mass is suddenly cooled or chilled, a milky appearance develops which greatly reduces the clarity of the sheet and the transmission of light. However, when the same sheet is cooled down slowly, the clarity when wet appears to remain to a large extent. I have discovered, also, that the clarity of the milky sheet may be substantially restored if the cured sheet is reheated to a temperature below that of the softening or deformation temperature of the resinous material, say 250° F., and then slowly cooled, as in an annealing process. Although the phenomenon is difficult to explain, examination under a polariscope indicates that the discoloration and turbidity may result from the higher concentration and intensity of the strains in the rapidly cooled compositions. These higher strains might also tend to cause some separation between the resinous material and the glass fibers with a corresponding loss in clarity. Whatever the reason may be, it appears that a stronger and more suitable product results from the use of the clearer template sheet having fewer strain forces.

Another important feature of this invention resides in the means for further varying the appearance and physical properties of the completed tubing by the proper selection and distribution of resinous materials. When tubing or pipe of a porous nature is desired, it is expedient to form the template sheet 20 of resinous materials 22 of the thermosetting type having a relatively high dilution so that the material, intentionally, will set up with a large number of voids. When fluid is passed through tubing formed of the porous template sheets, the fluids seep through the pipe walls and serve as a distribution system for the fluids or vapors, as in an irrigation system.

Even though the template sheet may unintentionally have numerous voids, as when resinous material other than the solventless varnishes are used, the adhesive layer 23 applied in the fabrication of the tubing may operate not only to join the adjacent layers, but also to close the surface voids and provide for an impervious wall through which fluids can not pass. To insure imperviousness, I prefer to employ as one or more layers in the tubing, an impervious film of resinous or rubber-like material. As illustrated in Figure 4 of the drawings, the impervious film 24 may comprise the inner wall portion of the tubing, as when it comprises the first layer wrapped about the mandrel; it may comprise an interlayer between template sheets a, b or c; it may form the outer skin of the tubing; or one or more impervious layers may be provided in various positions in the same tubing. Another method for fabricating tubing with impervious walls, illustrated in Figure 5 of the drawings, comprises the employment of resinous sheets or skins 25a and 25b interposed between layers 26a, 26b and 26c of a fabric of glass fibers and formed into a composite structure having excellent strength and other physical properties in response to molding under such elevated temperatures as will render the film-like resinous material sufficiently plastic for receiving the adjacent glass fibers in embedded relation.

By the proper selection and distribution of the resinous materials, tubing having self-sealing characteristics and improved flexibility and strength can be produced. For example, tubing having a wall construction consisting of a hard outer portion and a softer, more flexible inner wall portion may be made by forming the inner walls of template sheets impregnated with readily deformable and soft resinous materials having a low modulus of elasticity, while the templates forming the outer layers may be formed of resinous materials of greater hardness when converted to the full extent of polymeric growth. Obviously, various other modifications may be formed, such as a soft outer layer and a hard inner layer, hardened outer and inner layers with a soft central core, or a tubing may be formed in which the wall section is formed of layers that are comprised of resinous materials of a progressively harder or softer nature. Preferably the resinous materials used to form the template sheets are selected to be of the same or related composition with the desired differences in hardness resulting from the amount of plasticizer incorporated, modification of the monomeric substances of which it is formed, or by the reaction of the polymer constituents to various degrees of linear or polymeric growth.

For example, the template sheets used for the inner layers may be constituted of cellulose butyrate while the template sheets of the outer layers are of cellulose acetate; the resinous material used for the inner layers may be of vinyl butyral while the harder outer layers are formed of vinyl formal. Alternatively, the resinous material comprising inner layers may be polystyrene having a molecular weight of about 7,500, while the styrene polymer used for the outer layers may have a molecular weight in excess of 90,000; methyl methacrylate may be used as the resinous material throughout with the softer layers having about fifty per cent plasticizer, while the harder layers have about twenty per cent plasticizer. When the organo-silicon compounds are used as the impregnant, the hardness may be varied by the composition of the various silicones or else a rubbery elastomeric composition may be formed, in which the ratio of non-hydrolyzable organic groups attached to the silicon atom is slightly less than 2 to 1, while a thermosetting and harder compound is ordinarily formed with a lower ratio. Hard and soft rubbers may equally be employed.

In specific application, the template sheets 20 of the desired composition are helically wound in overlapping or side by side relation on the mandrel 11 until the desired wall thickness has been built up. Resinous binder 23 of the desired composition is applied, as by spraying, brushing, dipping, or by pre-coating the template sheet on one or both sides before or after it is wound on the mandrel. Since the amount of resinous material that need be cured is a relatively small portion of the entire mass, the cure is quickly effected at moderate conditions, say in about two to ten minutes at 250° to 450° F. When the binder is cured, the tubing is stripped from the mandrel. The stripping operation may be rendered difficult by adhesion or frictional resistance to the relative movement of the closely fitting surfaces, or the presence of uncured and tacky binder. When this occurs, the process is unduly delayed and the mandrel, as well as the molded article, are often damage beyond repair or recovery during the removal.

To obviate these difficulties, I employ a mandrel which is of a size to form the desired tubing or pipe, but when the cure has been completed, the mandrel may be distorted in a manner to release the tubing so that the tubing may be moved relative to the mandrel without effort or delay.

One suitable mandrel is shown in Figure 8 of the drawings, in which a cylindrical section 30 of wood or metal is split lengthwise along an inclined line 31 or helix so that after the pipe or tubing has been cured, the circumference of the mandrel may be reduced by moving one part endwise relative to the other to the position indicated by the broken lines. Thus the tubing 32 is fully released and relative movement from the mandrel may readily be effected.

Another form of mandrel employing the same general principles is illustrated in Figure 9 of the drawings. In this modification, a heavy walled sleeve 40 of resilient rubber-like material is disposed about a cylindrical core 41 of rigid material, such as wood, metal, ceramics, plastics and the like. The ends of the sleeve 40 are provided with retainer rings 42 and 43 respectively having puller bars 44 and 45 connected, as by screw-threaded engagement, to the central portion thereof. The sleeve fits over the core without appreciable tension and when the pipe 46 or tubing assembled thereon is fully cured, the retainer rings may be displaced endwise to stretch the sleeve, as illustrated by the broken lines. This causes the sleeve to thin and retract from the tubing, enabling relative movement as previously described.

A further modification of a mandrel adapted to impart the described characteristics for the manufacture of tubing is illustrated in Figure 10 of the drawings. The mandrel is formed of a rubber sleeve 50 that fits over a solid core 51 of metal or wood and is closed at its ends by plugs 52 and 53, one of which is fitted with a port 54 through which fluid pressure may be introduced from a passage 55 connected to a fluid pressure source. After the various layers 56 have been wound on the mandrel, the whole is enclosed between female mold parts 57 of the desired tubular contour and then pressure fluid is directed into the sleeve. This causes the sleeve sufficiently to deform to press the windings against the mold surfaces. After the tubing has been cured, the pressure fluids may be released, whereon the sleeve retracts and releases the tubing to enhance removal.

Although the great majority of tubing or pipe is manufactured in predetermined lengths on mandrels, for which mandrels of the types described are particularly suitable, I have found that endless lengths of tubing may be formed by a substantially continuous process with a corresponding improvement in physical characteristics. Seamless tubing might be thus produced. I have successfully manufactured tubing in a continuous process, the essential steps of which are illustrated in Figure 11 of the drawings. In this process, an endless template sheet 20 of a glass fiber fabric fully impregnated with a cured resinous material, with adhesive 23 on one or both faces thereof, but preferably only on the edge portion to be overlapped, is fed lengthwise over a substantially solid mandrel 60 having a smooth outer wall dimensionally corresponding to the size of the tubing to be produced. As the sheet moves lengthwise, it is progressively turned laterally until tightly wound about the mandrel in overlapping relation. The circumference of the mandrel is selected to be less than the width of the original sheet so that an overlapping relation is insured, and if it is still smaller, the wall may consist of more than one layer. The length of the tube, however, corresponds to the length of the sheet from which it is formed, and if the sheets are spliced, continuous lengths of tubing may thus be formed in a continuous manner. After the tubing has been formed on the mandrel, it is led through a curing section where the small amount of adhesive is advanced to unite the adjacent wall sections.

Generally the directional strength of the tubing may be regulated by the distribution of the fibers which make up the side wall construction. However, it is difficult in many instances to obtain sufficient resistance to kinking or binding to enable the pipe or tubing to be used as a structural member, such as a ladder rung, a strut, supporting rail or the like. However, I have found that if a number of laterally spaced reinforcing members, such as metallic rings 61, are incorporated as a part of the finished tubing 62, the structural strength, rigidity and transverse strength is greatly enhanced. These metallic rings may be cemented into an already formed tubing, or more conveniently, they may be embedded within the innermost layer 63a of the layers 63a, 63b and 63c by placing them about the mandrel in their desired spaced relation and then forming the tubing about them by any of the described means.

The various features of this invention are obvious from the description. More specifically, a cardinal feature is a method for manufacturing plastic pipe or tubing having little tendency to delaminate for the reason that the great majority of the resinous material therein is fully cured before assembly and the small amount of resinous material used to bind the fibrous reinforced resinous layers together is not sufficient to effect such dimensional change or relationship between layers as will set up undesirable amounts of strain. Another desirable advantage resulting from the employment of such small amounts of uncured resinous material in the final assembly is the saving in time necessary to convert the small portion of resin used as the binder. Still further, the resinous interlayer or binder may operate to fill the surface voids in the template sheets so that tubing walls are, as a result, impervious to the passage of fluids therethrough.

A still further feature of this invention is the production of tubing or pipe having a wall construction which, in section, may be varied from softness to hardness so as to provide for increased strength while retaining flexibility, strength and self-sealing characteristics. One or more layers may be formed of impervious layers of resinous or rubber-like materials, which selectively might also be resistant to particular substances with which the tubing may come in contact and also to eliminate corrosion or erosion effects, such as the electrolytic erosion often encountered in metallic tubing.

Other features of an inventive nature comprise the method of continuously forming endless lengths of fibrous reinforced plastic tubing with or without reinforcing means embedded as an integral part of the tubing wall.

It is to be understood that numerous changes in the details of construction, arrangement and operation of parts, as well as composition of ingredients, may be effected without departing from the spirit of the invention especially as defined in the following claims.

I claim:

1. The method of producing tubing comprising the steps of impregnating a glass fiber fabric with a curable resinous material in an intermediate stage of polymeric growth, substantially completely curing the resinous material of the impregnated glass fiber fabric, annealing the cured fabric to remove substantially all of the strain therefrom, applying a binding coat to the cured and annealed fabric of substantially less thickness than the thickness of the fabric, turning said fabric with the binding coat in overlapping relation about a mandrel to form a tubing, and then curing the binding coat to form an integrated tubing which is relatively free of strain.

2. The method of producing tubing comprising the steps of impregnating a glass fiber fabric with a resinous material in an intermediate stage of polymeric growth and curable to a hard resinous component, impregnating another glass fiber fabric with a similar resinous material in an intermediate stage of polymeric growth and curable to a state of less hardness than that of the resinous material in the first fabric, curing the resinous materials of the impregnated glass fiber fabrics, annealing the cured fabrics to remove substantially all of the strain therefrom, applying a binding coat to each of the cured and annealed fabrics of substantially less thickness than the thickness of the fabric, turning said cured fabrics with the binding coat thereon in overlapping relation about a mandrel to form a tubing with the fabric containing the resinous material curable to a softer state positioned inwardly of the other, and then curing the binding coat to form an integrated tubing which is substantially free of strain.

3. The method of producing tubing as claimed in claim 1 including the additional step of lining the tubing with a continuous layer of a film forming resinous material.

GAMES SLAYTER.

References Cited in the file of this patent

UNITED STATES PATENTS

| Number | Name | Date |
|---|---|---|
| 891,440 | Rader | June 23, 1908 |
| 1,284,298 | Frederick | Nov. 12, 1918 |
| 1,529,033 | Merrill | Mar. 10, 1925 |
| 1,565,532 | Tupper | Dec. 15, 1925 |
| 1,937,069 | Rado | Nov. 28, 1933 |
| 2,062,088 | Dreyer | Nov. 24, 1936 |
| 2,113,724 | Freedlander et al. | Apr. 12, 1938 |
| 2,256,386 | Farrar et al. | Sept. 16, 1941 |
| 2,354,556 | Stahl | July 25, 1944 |
| 2,360,109 | Converse | Oct. 10, 1944 |
| 2,383,733 | Parker | Aug. 28, 1945 |
| 2,393,347 | Stuart et al. | Jan. 22, 1946 |
| 2,399,338 | Ford | Apr. 30, 1946 |
| 2,414,125 | Rheinfrank, Jr. | Jan. 14, 1947 |
| 2,419,440 | Delmonte | Apr. 22, 1947 |
| 2,433,643 | Beach et al. | Dec. 30, 1947 |
| 2,451,126 | Stringfield et al. | Oct. 12, 1948 |
| 2,500,573 | Rockoff | Mar. 14, 1950 |
| 2,525,070 | Greenwald et al. | Oct. 10, 1950 |